J. C. LINCOLN.
MEANS FOR STARTING AND OPERATING MOTOR GENERATORS.
APPLICATION FILED MAY 29, 1917. RENEWED FEB. 25, 1922.
1,413,747.
Patented Apr. 25, 1922.
2 SHEETS—SHEET 1.
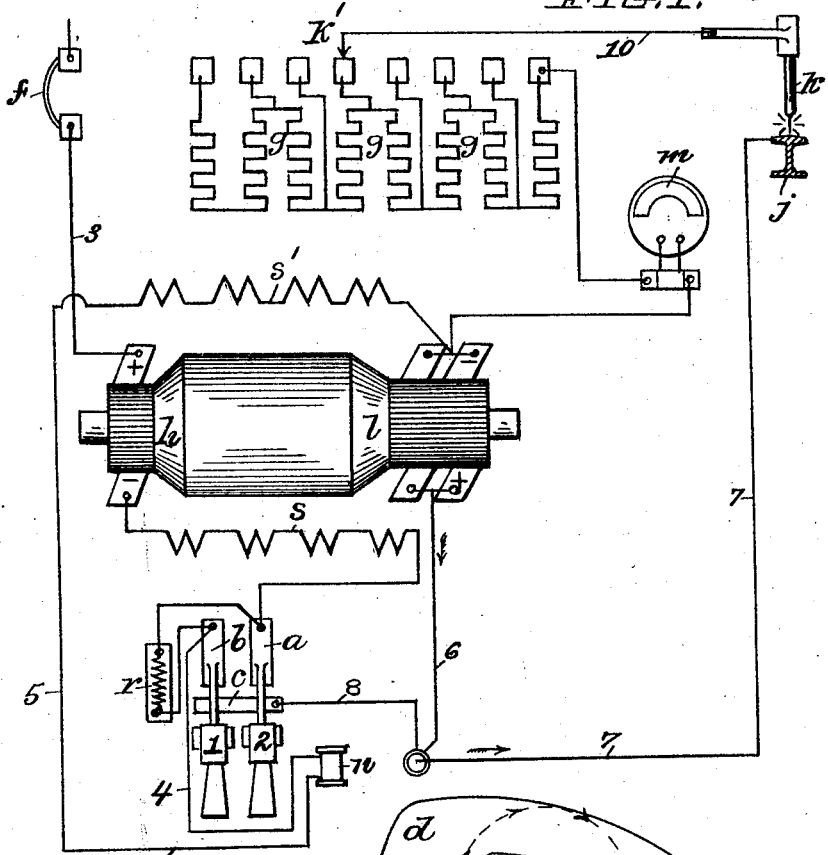
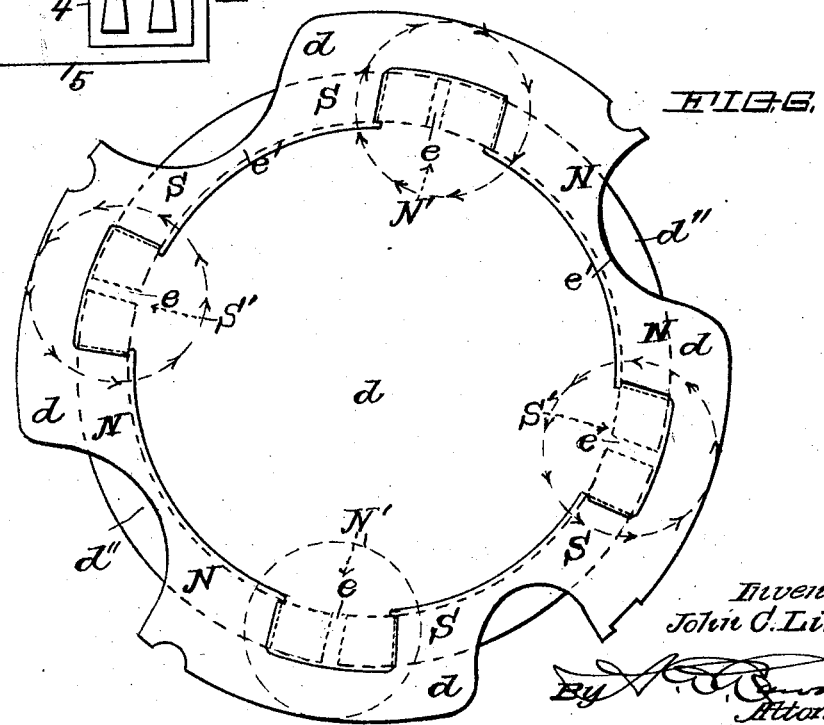
Inventor,
John C. Lincoln,
By
Attorney.

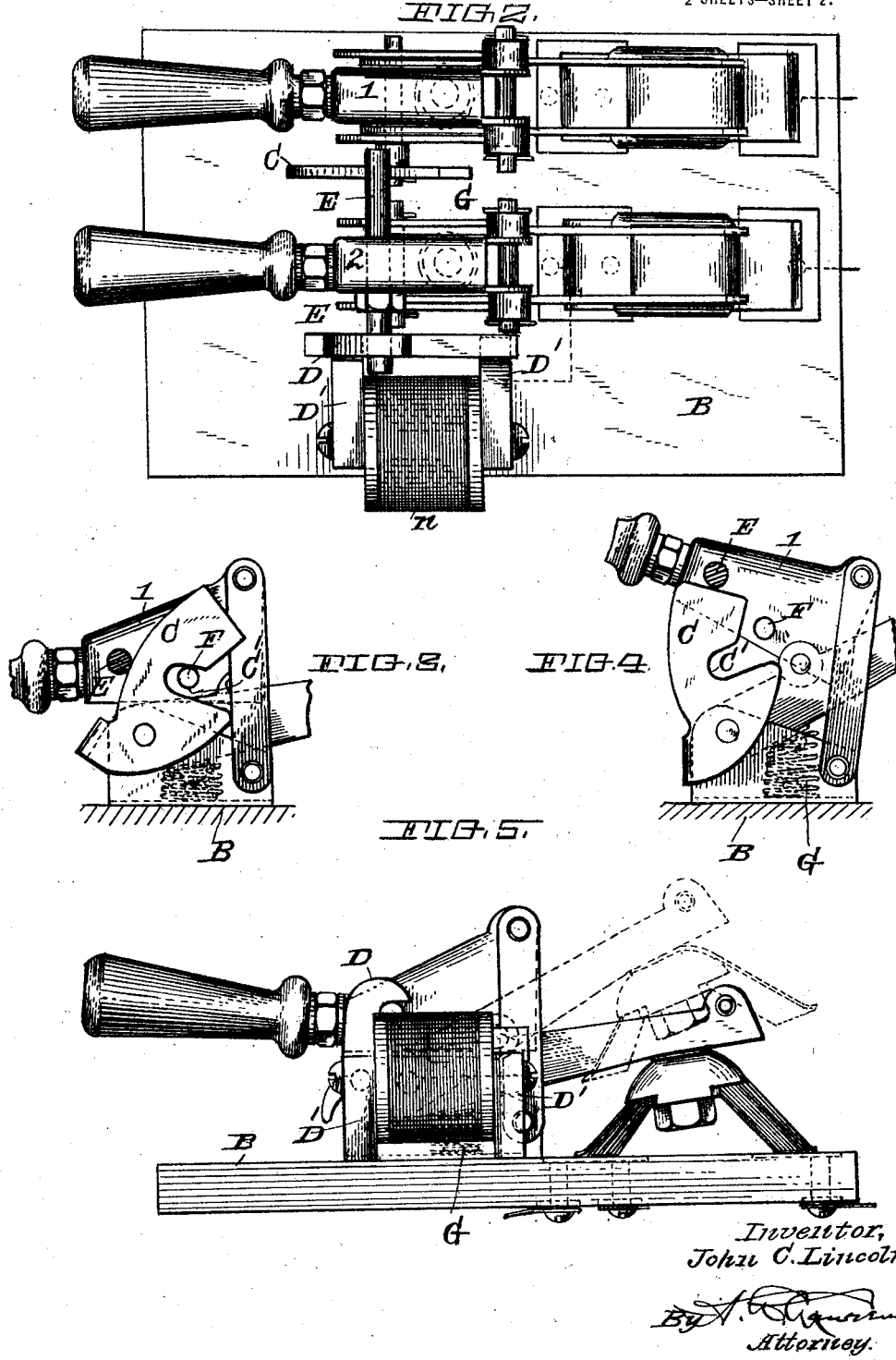

UNITED STATES PATENT OFFICE.

JOHN C. LINCOLN, OF CLEVELAND, OHIO, ASSIGNOR TO THE CITIZENS SAVINGS AND TRUST COMPANY, OF CLEVELAND, OHIO, A CORPORATION OF OHIO.

MEANS FOR STARTING AND OPERATING MOTOR GENERATORS.

1,413,747.   Specification of Letters Patent.   Patented Apr. 25, 1922.

Application filed May 29, 1917, Serial No. 171,650. Renewed February 25, 1922. Serial No. 539,290.

*To all whom it may concern:*

Be it known that JOHN C. LINCOLN, a citizen of the United States, residing at Cleveland, in the county of Cuyahoga and State of Ohio, has invented certain new and useful Improvements in Means for Starting and Operating Motor Generators, of which the following is a specification.

My invention relates to improvements in means of starting and operating motor converters and has for its object the provision of means for initially connecting all of the windings in series relation until substantially normal speed is attained and thereafter connecting said windings in the normal series shunt operating relationship. My said invention contemplates a means in addition whereby all unnecessary iron is cut out of the field structure to obtain a machine of light weight; the iron being disposed to prevent reversal of polarity or "flash-over" through throttling the flow of magnetic lines in certain portions of the fields.

My invention is particularly adapted for use in connection with a portable motor converter designed for use upon street railway lines and I may explain the same as thus specifically applied, although it should be understood that my invention is not restricted to the particular use recited nor to the structures featured, except as the same may be limited by the claims.

This invention may best be explained in connection with the accompanying drawings wherein Fig. 1 is a diagrammatic view showing the preferred circuit arrangement for practicing my invention;

Fig. 2 is a plan view of a suitable switch mechanism.

Figs. 3 and 4 are fragmentary views thereof illustrating its interlocking means.

Fig. 5 is a view of said switch mechanism in side elevation, and Fig. 6 is a view of the field structure of the motor converter.

Throughout the several figures of the drawings, I have employed the same character of reference to indicate similar parts.

Referring first to Fig. 1, the convential symbols will indicate to those skilled in the art, a motor converter or motor generator adapted to be operated for producing an arc of low voltage through a ground circuit terminating respectively in a carbon and the rail to be operated upon. Current preferably is taken from the trolley circuit for driving the motor.

The field structure preferably is integral and of four pole type within which rotates the armature provided with two windings. The motor windings commonly will be designed for a current of 500 volts while the generator windings may advantageously be proportioned to produce 70 volts. It will be understood that said windings upon the armature will be insulated from each other. Similarly there are provided two field windings which normally are in series and shunt relation respectively with the motor and generator circuits. The usual controlling resistance grids and ammeter are employed for regulating the low voltage circuit.

With these general features in mind, I may now refer to the diagram of Fig. 1 which shows the apparatus for practicing my method in its normal operating relation. In starting, however, both the switches 1 and 2 are open and preferably are so constructed that they must be closed in the order named. Assuming that said switches both are open, it will be seen from the diagram that all of the motor and generator windings are in series relation. Current is taken from the trolley circuit and passes through fuse $f$, conductor 3 and the high voltage windings $h$ of the motor, thence through the series field windings $s$ to the base $a$ of switch 2, starting resistance $r$, conductor 4, no-voltage release-coil $n$, conductor 5, shunt field coils $s'$, low resistance generator windings $l$ and conductor 6 to the ground cable or conductor 7.

This connection throws all of the resistance of the shunt coils in series with the circuit which serves to cut the current down materially, due to the high resistance. It also furnishes a very strong field with a minimum current, so that the armature is rapidly brought up to speed. When said armature has attained from 75% to 95% approximating full speed, switch 1 is depressed thereby effecting the subdivision in these series circuits.

Tracing the course of the current again under these conditions, it will be seen that the operating current flows from the trolley through fuse $f$, conductor 3, winding $h$ of the armature, series field windings $s$ to the base $a$ of switch 2, starting resistance $r$, switch 1 to common contact $c$, conductor 8 to the ground conductor cable 7. The speed of the armature is high enough under these conditions so that the voltage of the low voltage windings approximates 75-90% of its full voltage and the shunt fields $s'$ are excited by current which passes from the positive brush of the low voltage windings $l$ to contact $c$ through switch 1 to the base $b$, thence by conductor 4 to the no-voltage release-coil $n$, conductor 5 and the shunt field windings $s'$ to the negative brush of the low voltage armature windings $l$.

This closing switch 1, therefore, may be said to differentiate the two circuits and place them in condition for normal operation after the necessity for series connection has been overcome. Thereafter switch 2 may be closed, which merely short-circuits the starting resistance $r$; leaving the circuit through the shunt field coils from the low voltage armature windings as above described. Switch 2 is associated with the no-voltage release-coil so that it is maintained closed as long as current through said coil is sufficiently strong to retain the switch against its actuating spring. Preferably, switches 1 and 2 are so inter-related that they must be closed in the order named while the release of switch 2 causes the opening of switch 1 as well.

In practice, the motor converter ordinarily is placed in condition for starting by connecting the conductors associated with fuse $f$ in contact with the trolley wire by means of a pole, and similarly said motor converter may be stopped merely by breaking this connection with the trolley wire. However, the voltage of both armatures will continue after the motor circuit is opened, due to the inertia of the armature, as only friction reduces the speed of the armature and consequently the voltage across the low voltage armature. When the speed and therefore the voltage has dropped to such a degree that coil $n$ is weakened sufficiently to release switches 1 and 2 they will then return to their normal open position.

I have shown in Figs. 2 to 5, switch mechanism, by way of illustration, which is adapted to be employed in the circuit and for the purposes herein described. Minor details of the switch construction are assumed to be non-essential, since this forms no part of my invention.

The switches 1, 2 are mounted side by side upon base B; their inter-relation being secured by a cam-latch C and the electromagnetically controlled catch D which is acted upon by windings $n$. Catch C is so positioned, as shown in Fig. 4, that the transverse rod E, mounted on switch 2, will engage its upper edge, and prevent the closing of said switch 2, as long as switch 1 is open. Moreover, latch C is provided with a slot C′ adapted to be engaged by the transverse pin F, mounted on switch 1, in order to move the latch into the position shown in Fig. 3, whereupon switch 2 may be closed and rod E will pass behind the latch C and hold it and switch 1 in depressed positions as long as current is maintained in windings $n$. This serves to attract catch D between the poles D′ and holds switch 2 temporarily closed through the medium of the opposite extremity of rod E. Springs G are provided for both switches, tending constantly to throw them to their open positions and acting thus immediately upon the release of catch D.

The arc current of the low voltage windings $l$ may be traced from the positive brush through ground cable 7, rail $j$, carbon $k$, conductor 10 and resistance grids $g$, ammeter $m$ to the negative brush of the low resistance windings. It will be understood that the amount of current through the arc established between carbon $k$ and rail $j$ may be regulated by moving the adjustable contact $k'$ controlling the resistance grids, in accordance with the voltage of the trolley circuit.

As stated, the field structure preferably is made as light as possible in order to adapt it better to the purpose named. The mass of iron is so disposed as to throttle the flow of magnetic lines in certain portions thereof. Preferably said field structure is built up from laminations, having the general contour exhibited in Fig. 6, wherein the central circular portion $d'$ represents the armature space about which are disposed the four openings $e$ for accommodating the field coils $d''$ partly indicated by dotted lines.

It will be observed that the approximate centers $e'$ of the field poles are deeply cut-away so that the body of iron not only is materially reduced but in addition, a marked throttling effect on the magnetic lines is obtained in these four localized areas. While the structural reason for this disposition of iron is found in the material reduction in weight, coupled with the provision of integral laminæ, the magnetic effect requires some further explanation.

Normally, the magnetic poles of the machine will be induced by the field windings as indicated by the letters N. S. N. S. in Figure 6.

This machine, however, is in use on street car lines where the voltage is liable to increase as much as 200 volts instantaneously. When the voltage increases, the speed of the armature has to increase proportionately to provide the necessary counter electromotive force. During the time that the speed of the armature is increasing, very large currents pass through the armature. These large currents in the armature produce armature poles at the points N′ S′

N' S'. These armature poles produce a cross flux on the magnetic poles N. S. and N. S.

This cross flux is reduced by the removal of the parts of the field ring, and any cross flux which exists must pass through the narrow part of the pole pieces in the middle of the main induced pole. Removing the iron from the middle of the four induced poles, does not interfere with the flow of the useful magnetic flux, but it does prevent to a very great degree, the production of cross magnetizing flux. If the centers of the induced poles were not recessed in the manner shown, the cross magnetizing flux might become great enough to cause violent sparking of the brushes and flashovers from one brush to the other, around the commutator and it is to lessen the chance of these flashovers that the iron back of the induced poles is removed.

Having now described the preferred method of my invention, and the means for placing it in operation, I claim as new and desire to secure by Letters Patent, the following:—

The combination of a dynamotor having the motor field and armature windings separate from the generator field and armature windings, and switching mechanism adapted to connect all of said windings in series relationship while starting, and to connect said generator windings in shunt relationship with said motor windings when approximately normal speed has been attained.

In testimony whereof I do now affix my signature in the presence of two witnesses.

JOHN C. LINCOLN.

Witnesses:
 FRANK BUBUA,
 ALBERT LYNN LAWRENCE.